(12) United States Patent
Kitakado

(10) Patent No.: US 7,844,228 B2
(45) Date of Patent: Nov. 30, 2010

(54) METHOD OF DETERMINING TRANSMISSION RATE BY CONTROLLING ADAPTIVE MODULATION SCHEME

(75) Inventor: Jun Kitakado, Hashima (JP)

(73) Assignee: Kyocera Corporation, Kyoto (JP)

( * ) Notice: Subject to any disclaimer, the term of this patent is extended or adjusted under 35 U.S.C. 154(b) by 445 days.

(21) Appl. No.: 10/577,766

(22) PCT Filed: Oct. 12, 2004

(86) PCT No.: PCT/JP2004/015033

§ 371 (c)(1),
(2), (4) Date: Jan. 3, 2007

(87) PCT Pub. No.: WO2005/043945

PCT Pub. Date: May 12, 2005

(65) Prior Publication Data

US 2007/0217357 A1    Sep. 20, 2007

(30) Foreign Application Priority Data

Oct. 31, 2003    (JP) .............................. 2003-371866

(51) Int. Cl.
*H04B 7/00* (2006.01)

(52) U.S. Cl. .................. 455/69; 455/561; 455/420; 455/425; 455/522; 370/332

(58) Field of Classification Search ............... 455/63.1, 455/67.13, 69, 450, 452.1, 464, 453, 501, 455/509, 512, 513, 522, 574, 561, 420, 425; 370/204, 232–235, 252, 311, 318–322, 328–337, 370/341, 348, 437, 443–444; 375/225, 243, 375/261, 268, 298, 300–302

See application file for complete search history.

(56) References Cited

U.S. PATENT DOCUMENTS 6,359,877 B1 *    3/2002    Rathonyi et al. ............ 370/349

(Continued)

FOREIGN PATENT DOCUMENTS

JP    11-234242 A    8/1999

(Continued)

OTHER PUBLICATIONS

English Translation of Written Opinion of the International Search Authority issued in corresponding International Application No. PCT/JP2004/015033.

(Continued)

*Primary Examiner*—Kamran Afshar
*Assistant Examiner*—Babar Sarwar
(74) *Attorney, Agent, or Firm*—Morrison & Foerster LLP

(57) ABSTRACT

Deterioration of transmission efficiency due to a change in modulation scheme is prevented. A terminal apparatus determines a line which is to be given the priority between an uplink or downlink, according to an application activating operation from an operator, and then makes a request accordingly to a base station apparatus. The base station apparatus detects a request signal on a downlink or uplink to be prioritized. If the request signal indicates that the downlink be prioritized, the execution of a processing of changing a transmission rate of the uplink involving the stoppage of the downlink is cancelled. If the request signal indicates that the uplink be prioritized, the execution of a processing of changing a transmission rate of the downlink involving the stoppage of the uplink is cancelled.

10 Claims, 9 Drawing Sheets

U.S. PATENT DOCUMENTS

| | | | |
|---|---|---|---|
| 6,400,929 B1* | 6/2002 | Ue et al. | 455/69 |
| 6,836,666 B2* | 12/2004 | Gopalakrishnan et al. | 455/452.2 |
| 6,928,268 B1* | 8/2005 | Kroner | 455/69 |
| 7,539,165 B2* | 5/2009 | Toskala et al. | 370/335 |
| 7,693,097 B2* | 4/2010 | Hoekstra et al. | 370/310 |
| 2002/0141349 A1* | 10/2002 | Kim et al. | 370/252 |
| 2002/0151310 A1* | 10/2002 | Chung et al. | 455/452 |
| 2002/0154610 A1* | 10/2002 | Tiedemann et al. | 370/329 |
| 2003/0156580 A1* | 8/2003 | Abraham et al. | 370/389 |
| 2004/0022177 A1* | 2/2004 | Awad et al. | 370/204 |
| 2007/0206623 A1* | 9/2007 | Tiedemann et al. | 370/431 |

FOREIGN PATENT DOCUMENTS

| | | |
|---|---|---|
| JP | 2002-290246 A | 10/2002 |
| JP | 2002-299462 | 10/2002 |
| JP | 2003-198556 A | 7/2003 |
| JP | 2004-135180 A | 4/2004 |

OTHER PUBLICATIONS

Chinese Office Action, with English translation, issued in Chinese Patent Application No. CN 200480032322.9, mailed May 9, 2008.

Japanese Office Action, with English Abstract, issued in Japanese Patent Application No. JP 2005-515107 dated on Sep. 16, 2008.

* cited by examiner

FIG.2

| D/U | MODULATION SCHEME |
|---|---|
| A AND ABOVE | 16QAM |
| A − B | QPSK |
| B AND BELOW | BPSK |

FIG.4

| TERMINAL ID | FUNCTION VERIFICATION INFO | LINE PRIORITY INFO | MODULATION SCHEME | |
|---|---|---|---|---|
| | | | DOWN | UP |
| 11111 | Type_A | DOWN PRIORITY | 16QAM | π/4QPSK |
| 22222 | Type_A | UP PRIORITY | π/4QPSK | 16QAM |
| 33333 | Type_B | — | π/4QPSK | π/4QPSK |

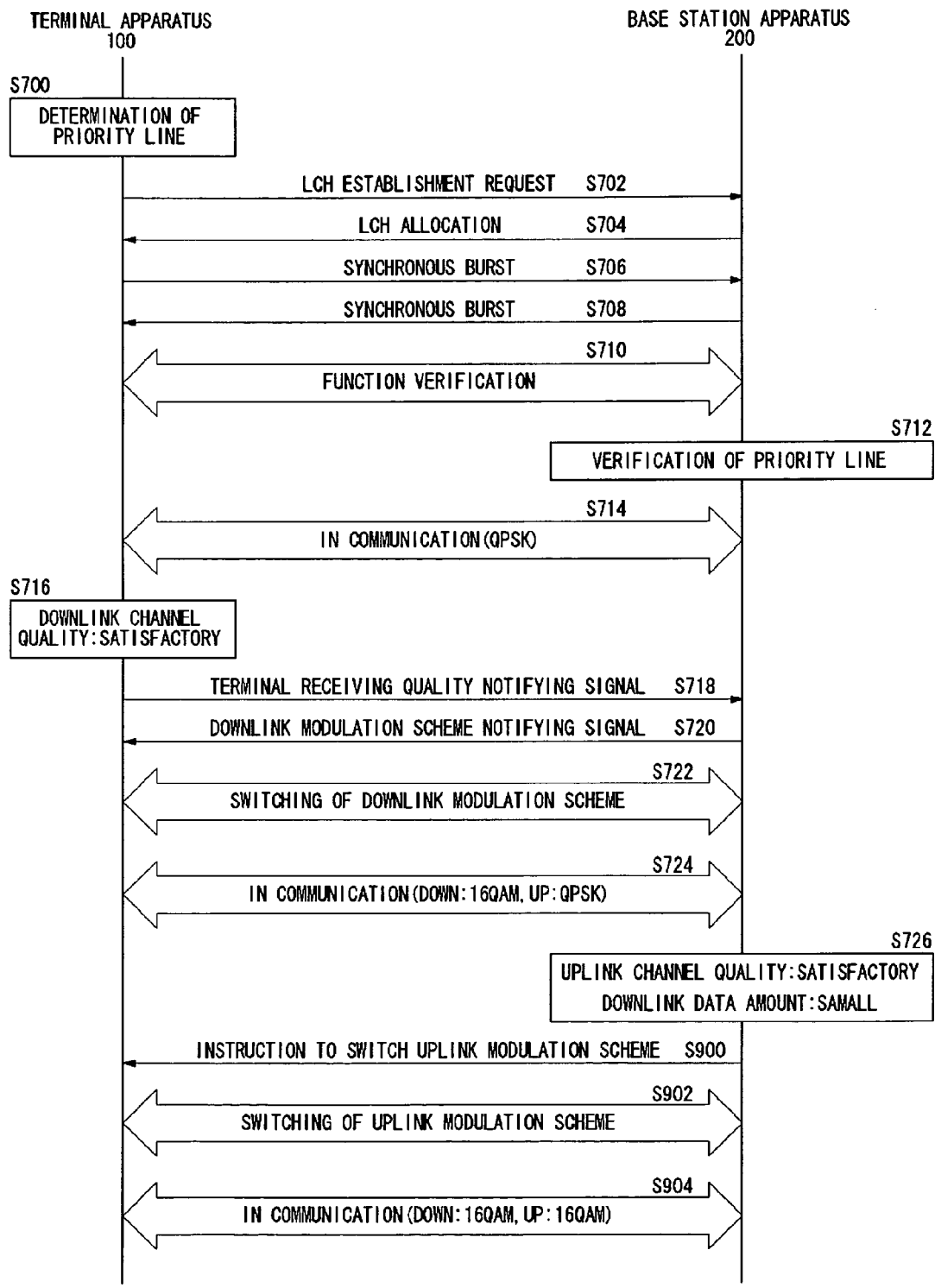

METHOD OF DETERMINING TRANSMISSION RATE BY CONTROLLING ADAPTIVE MODULATION SCHEME

RELATED APPLICATIONS

This application is the U.S. National Phase under 35 U.S.C. §371 of International Application No. PCT/JP2004/015033, filed on Oct. 12, 2004, which in turn claims the benefit of Japanese Application No. 2003-371866, filed on Oct. 31, 2003, the disclosures of which Applications are incorporated by reference herein.

TECHNICAL FIELD

The present invention relates to the transmission rate determining method. And it particularly relates to a transmission rate determining method for varying the transmission rate during communication, and base station apparatus and terminal apparatus utilizing said method.

BACKGROUND TECHNOLOGY

In the wireless communication system, the channel environments vary with time. The adaptive modulation system is one of techniques that enhance the transmission rate in such channel environments. The adaptive modulation scheme controls the modulation scheme in accordance with channel environments. For example, if the channel environment is judged to be poor, the data is transmitted using a modulation scheme which is highly reliable. If, on the other hand, the transmission environment is satisfactory, the data is transmitted using a modulation scheme that can hold a large amount of information. If a base station apparatus and a terminal apparatus included in a wireless communication system communicate using a TDD (Time Division Duplex) scheme, a slot for the uplink and that for the downlink are generally transmitted alternately on a regular basis.

If the reversibility of a channel holds in the TDD scheme, the base station apparatus receives the slots and detects a C/N (Carrier to Noise Ratio), delay spread, RSSIs (Received Signal Strength Indicators) or the like of the channel, from information, on receiving level, such as received baseband signals so as to estimate a channel environment at the next transmission timing. In accordance with this estimation result, the base station apparatus selects a modulation scheme to be used for transmission (see Patent Document 1, for instance).

[Patent Document 1]

(1) Japanese Patent Application Laid-Open No. 2002-290246.

DISCLOSURE OF THE INVENTION

Problems to Be Solved by the Invention

Under such circumstance, the inventors of the present invention have recognized the following problems.

In the conventional technique, for example, where it is considered that the reversibility of a channel holds in a communication using the TDD scheme, the transmission rate is set by an adaptive modulation such that no distinction is made between the uplink and the downlink. However, the difference in structure between the base station apparatus and the terminal apparatus causes the radio output of a transmitter or the antenna gain of a receiver to differ widely. Thus, there may be a case where it is not appropriate to connect the uplink and the downlink by using the same modulation scheme. In the case of an FDD (Frequency Divided Duplex) scheme or the like, the frequency used differs in between the uplink and the downlink. Thus, the effect of the channel environment differs also in between the uplink and the downlink.

In contrast thereto, a method may be considered where the quality of a channel is monitored in the uplink and the downlink, respectively, and the transmission rate suitable for the channel quality is set individually. With this, for example, if the measurement result of the channel quality in the uplink is inferior to that in the downlink, the modulation scheme that can hold a large amount of information will be used for the downlink and the highly reliable modulation scheme will be used for the uplink, respectively, which in turn can set the optimum transmission rates for the both.

Now, as described above, the transmission rates respectively suitable for the uplink and the downlink can be set. However, the data-generation amount transmitted and received in the uplink and the downlink in the actual communication depends on the operation of an application that uses the data. That is, when the application is running for such a case when websites are browsed and the downloading is done, the most of data transmitted and received are generated in the downlink and few amount of data is generated in the uplink.

Under such conditions, assume that a method is employed where the qualities of the uplink and the downlink are measured individually. When the quality of a channel in the uplink is judged to be satisfactory, a processing of changing the transmission rate of the uplink is activated even in the event that a large amount of data is tentatively generated in the downlink. The establishment of synchronization is attempted in this processing. Hence, the communication in the uplink and the downlink is temporarily stopped and the burst signals are simultaneously sent out to the respective lines so as to attempt to establish the synchronization.

The present invention has been made in the recognition of the foregoing circumstances, and a purpose thereof is to provide a transmission rate determining technique where, in a case of setting the optimum transmission rates by measuring the qualities of an uplink and a downlink individually, a degree of priority for the communication in the uplink or downlink is set and the transmission rates are determined according to the degree of priority, and to provide a base station apparatus and a terminal apparatus utilizing said technique.

Means for Solving the Problems

An embodiment according to the present invention relates to a base station apparatus.

This apparatus comprises: a communication unit which communicates with a predetermined terminal apparatus at a variable transmission rate; a transmission rate varying unit which performs a processing of varying a transmission rate of an uplink or downlink according to a channel quality for the terminal apparatus; a detector which detects information on a degree of priority for either the uplink or downlink from among signals received from the terminal apparatus; and a communication control unit which maintains a transmission rate based on the detected degree of priority.

This apparatus comprises: a communication unit which communicates with a predetermined terminal apparatus at a variable transmission rate; a transmission rate varying unit which measures a quality of a channel for the terminal apparatus and performs a processing of varying a transmission rate of an uplink, involving stoppage of a downlink communication according to the quality; a detector which detects information on a degree of priority for the downlink from among signals received from the terminal apparatus; and a communication control unit which maintains a transmission rate of the uplink if the downlink has a higher degree of priority.

This apparatus may comprise: a communication unit which communicates with a predetermined terminal apparatus at a variable transmission rate; a transmission rate varying unit which acquires information on a channel quality from the terminal apparatus and performs, based on the information, a processing of varying a transmission rate of a downlink involving stoppage of an uplink communication; a detector which detects information on a degree of priority for the uplink from among signals received from the terminal apparatus; and a communication control unit which maintains a transmission rate of the downlink if the uplink has a higher degree of priority.

By employing the above apparatus, when a processing of adaptive modulation is carried out, the activation of a modulation scheme switching processing is so controlled that the data communication in a line so set as to be given the priority between the uplink or downlink is given the priority. Thus, for example, when the degree of priority for communication in the downlink is high and a large amount of data is transmitted and received in the downlink, the switching of a modulation scheme in the downlink is not switched, so that a temporary interruption of the downlink is not caused and therefore the deterioration of transmission efficiency can be prevented.

The apparatus may further comprise a signal monitoring unit which monitors a type or amount of signals transmitted from and received by the communication unit, wherein the communication control unit may be such that it does not stop the varying processing in the transmission rate varying unit, according to the type or amount of signals of a line which is required to be prioritized by the information on a degree of priority.

By employing the above apparatus, when carrying out a processing of adaptive modulation, the base station apparatus controls the activation of a modulation scheme switching processing so that the data communication in a line so set as to be given the priority between the uplink or downlink is given the priority, and also controls the activation of a processing of changing the modulation scheme while monitoring the actual signal amount of a line to be prioritized. Thus, the deterioration of transmission efficiency for not only the line to be prioritized but also the line not to be prioritized can be even more prevented.

Another embodiment according to the present invention relates to a terminal apparatus.

This apparatus comprises: a communication unit which communicates with a predetermined base station apparatus at a variable transmission rate; a decision unit which determines either an uplink or a downlink, to which priority is to be given, with the base station apparatus; and a communication control unit which maintains a transmission rate based on the determined degree of priority.

If the downlink is determined to be prioritized, the communication control unit may disregard an instruction, issued from the base station apparatus, about a change in an uplink transmission rate and if the uplink is determined to be prioritized, it may be arranged that the communication control unit does not request the base station apparatus to vary the transmission rate, regardless of a channel quality of the downlink.

The apparatus may further comprise a signal generator which generates a request signal, as information on the degree of priority of a line, for a line to which priority is to be given and which sends it out to the base station apparatus.

By employing the above apparatus, the terminal apparatus determines a line which is to be given the priority between an uplink or downlink, according to an application activating operation from an operator, conveys it to the base station apparatus and disregards a request signal, instructed from the base station apparatus, indicating that the line to be prioritized shall be interrupted. Thus, the efficient communication which corresponds to a data-generation situation for each application can be carried out.

Still another embodiment according to the present invention relates to a method for determining a transmission rate.

The method is such that a request signal about a degree of priority for either an uplink or a downlink is detected from a terminal apparatus to be communicated at a variable transmission rate and if the degree of priority for one of the uplink and the downlink with the terminal apparatus is higher than that for the other, a transmission rate of the other line is maintained.

By employing the above method, when a processing of adaptive modulation is carried out, the activation of a modulation scheme switching processing is so controlled that the data communication in a line so set as to be given the priority between the uplink or downlink is given the priority. Thus, for example, when a large amount of signals is transmitted and received in the downlink, the temporary stoppage of the downlink to switch the modulation scheme of the uplink is not caused, so that the deterioration of transmission efficiency can be prevented.

Still another embodiment according to the present invention relates to a program.

This program includes the functions of: detecting via a wireless network a request signal about a degree of priority for either an uplink or a downlink, from a terminal apparatus to be communicated at a variable transmission rate and storing it in a memory; and maintaining a transmission rate of the uplink if the request signal stored in the memory indicates that the downlink is to be given priority or maintaining a transmission rate of the downlink if the request signal stored in the memory indicates that the uplink is to be given priority.

It is to be noted that any arbitrary combination of the above-described structural components and the expressions according to the present invention changed among a method, an apparatus, a system, a recording medium, a computer program and so forth are all effective as and encompassed by the present embodiments.

Effects of the Invention

According to the present invention, setting priority to either the uplink or the downlink is made in a radio link set between a terminal apparatus and a base station apparatus, and an optimum transmission rate is determined by referring to the information on the setting thereof, the quality of a channel or the data-generation amount of signals transmitted and received. Thus, the deterioration of transmission efficiency can be prevented.

BRIEF DESCRIPTION OF THE DRAWINGS

FIG. 2 is a comparison table used in determining the switching of modulation scheme shown in FIG. 1.

FIG. 4 illustrates a structure of data stored in a storage unit of FIG. 1.

FIG. 9 is a sequence diagram for connection between the terminal apparatus and the base station apparatus of FIG. 1.

DESCRIPTION OF REFERENCE NUMERALS

10 communication system, 100 terminal apparatus, 102 operation display unit, 104 processing unit, 105 priority information generator, 106 function verification unit, 108 storage unit, 110 modem unit, 112 quality measurement unit, 114 modulation scheme determining unit, 116 radio unit, 118 terminal antenna, 120 control unit, 200 base station apparatus, 202 basestation antenna, 204 radio unit, 206 modem unit, 208 processing unit, 210 quality deriving unit, 212 modulation scheme control unit, 214 function verification unit, 215 priority information detector, 216 storage unit, 218 data amount monitoring unit, 220 interface unit, 222 control unit

THE BEST MODE FOR CARRYING OUT THE INVENTION

The present embodiments relate to a transmission rate determining method in which when transmission rates are set at uplink and downlink, respectively, according to a transmission channel, environment, information as to which line is to be prioritized between the uplink and downlink is obtained and the transmission rate is set based on said information, and relate also to a base station apparatus and a terminal apparatus utilizing said method.

A terminal apparatus according to the present embodiment determines a line to be prioritized between the uplink or downlink, according to an application start-up operation from an operator, and communicates it to a base station apparatus 200. The base station apparatus according to the present embodiment detects a request signal with which to set which line is be prioritized between the uplink or downlink, from a signal received from a terminal apparatus to be communicated at a varying transmission rate. If the request signal indicates that the downlink shall be prioritized, the execution of a processing to change the transmission rate of uplink involving the stoppage of downlink communication will be discontinued. If the request signal indicates that the uplink shall be prioritized, the execution of a processing to change the transmission rate of downlink involving the stoppage of uplink communication will be discontinued. That is, the processing to change the transmission rate of a line having the lower degree of priority is stopped.

Figure 1:
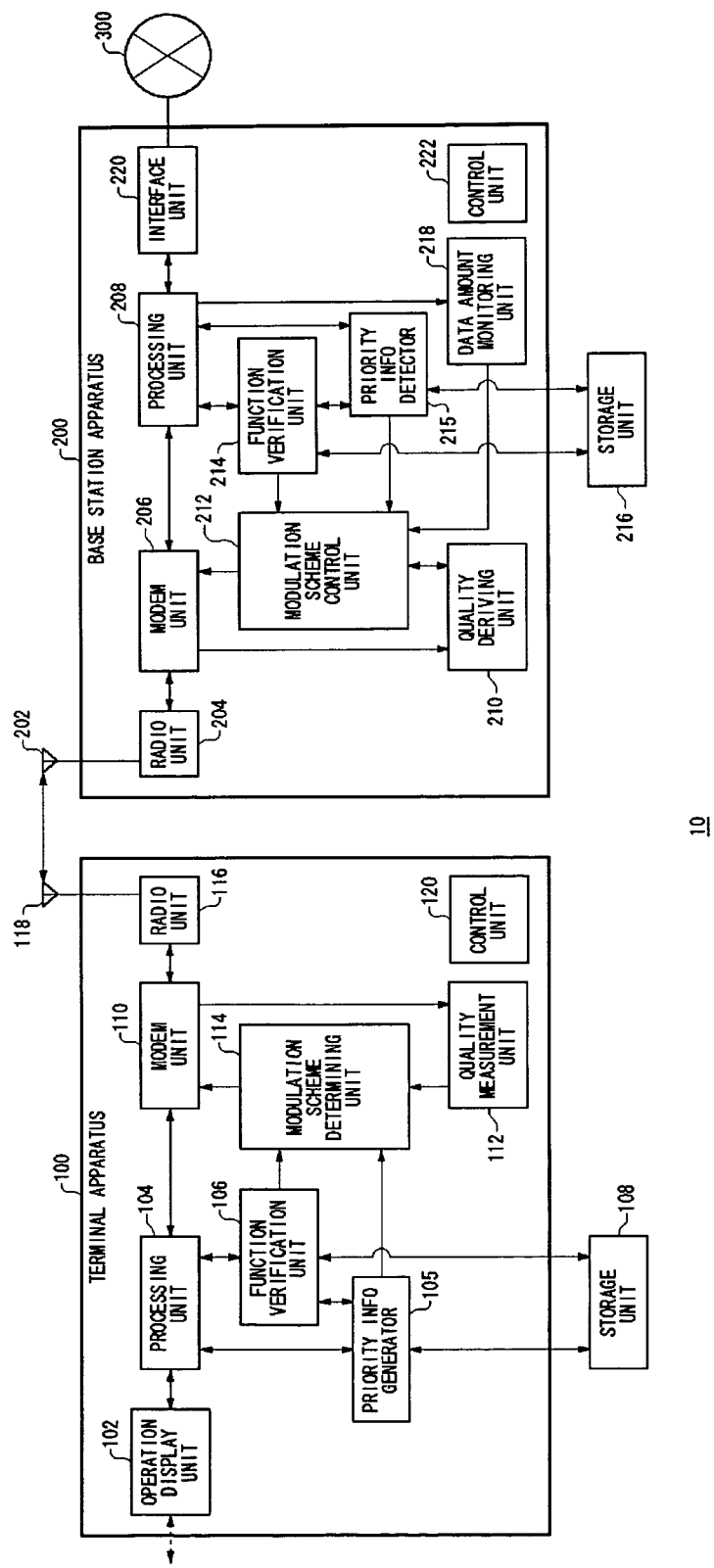
FIG. 1 illustrates a communication system according to the present embodiment.

FIG. 1 shows a communication system according to the present embodiment. The communication system 10 includes a terminal apparatus 100, a base station apparatus 200 and a network 300.

The terminal apparatus 100 includes an operation display unit 102, a processing unit 104, a priority information generator 105, a function verification unit 106, a storage unit 108, a modulation unit 108, a modem unit 110, a quality measurement unit 112, a modulation scheme determining unit 114, a radio unit 116, a terminal antenna 118 and a control unit 120. The base station apparatus 200 includes a basestation antenna 202, a radio unit 204, a modem unit 206, a processing unit 208, a quality deriving unit 210, a modulation scheme control unit 212, a function verification unit 214, a priority information detector 215, a storage unit 216, a data amount monitoring unit 218, an interface unit 220 and a control unit 222.

The operation display unit 102, which is an interface with which to operate a terminal apparatus externally, receives the operation state of the start or termination of application software from an operator, conveys the start or termination of communication corresponding thereto to the processing unit, described later, and at the same time obtains a processing status or result from the processing unit 104 so as to display it as a message. It is to be noted that the operation display unit 102 may be not only a unit, which the operator directly handles, such as a keyboard or a liquid crystal display, but also a connection interface to use a personal computer or other information equipment as an operation indicator.

The processing unit 104 carries out a processing of connecting and disconnecting the radio link in response to an instruction of connection or disconnection from the operation display unit 102 and at the same time instructs the priority information generator 105, described later, to generate information on a line to be prioritized.

The priority information generator 105 receives an instruction from the processing unit 104 and generates the information on a line to be prioritized. More specifically, the priority information generator 105 inputs information on application activated in the operation display unit 102, decides, based on the information, a line to be given the priority between the uplink or downlink, and generates a request signal with which to be communicated to the base station apparatus 200.

When it receives from the processing unit 104 a function verifying instruction on the connection of radio channel, the function verification unit 106 reads out information, on the function of the terminal apparatus 100, stored in the storage unit 108 and exchanges function verification information with the base station apparatus 200 via the processing unit 104.

The storage unit 108 stores the information on the function of the terminal apparatus 100 and the setting information on a line to be prioritized and at the same time stores information, on the function of the base station apparatus 200, obtained by exchanging function verification information with the base station apparatus 200

The modem unit 110 modulates information to be transmitted and demodulates the received information. Here, for example, a terminal apparatus having adaptive modulation functions is provided with a plurality of modulation schemes, such as BPSK:Binary Phase Shift Keying, $\pi/4$ shift QPSK: Quadrature Phase Shift Keying and 16QAM:Quadrature Amplitude Modulation, which are changed adaptively in accordance with an instruction or notification from the base station apparatus 200. As for the decision of modulation and demodulation schemes, the modulation scheme is determined by an instruction from the base station apparatus 200 whereas the demodulation scheme is determined by a response signal of the base station apparatus 200 to a request signal from the terminal apparatus 100 to the base station apparatus 200.

The quality measurement unit 112 inputs the received signal from the modem unit 110 and measures the receiving quality thereof as appropriate. Though the quality of received signals to be measured may be arbitrary, measured here is a signal demodulated by the modem unit 110, the strength of a desired signal from an RSSI (Received Signal Strength Indicator), the strength of a received interference signal, the ratio in strength between desired signal and interference signal, or the like. Alternatively, the error rate of a signal demodulated by the modem unit 110 may be measured.

From the quality of a signal measured by the quality measurement unit 112, the modulation scheme determining unit 114 determines the modulation scheme corresponding to said measured signal, and generates a signal by which the determined modulation scheme is conveyed to the base station apparatus 200. For example, when the signal quality is the ratio in strength between desired signal and interference signal, a first reference value and a second reference value are defined beforehand such that the level of the first reference value is higher than that of the second reference value and then these values are stored. And if the measured strength ratio is greater than or equal to the first reference value, the modulation scheme is determined to be 16QAM. If the measured strength ratio is less than the first reference value and greater than or equal to the second reference value, the modulation scheme is determined to be $\pi/4$ shift QPSK. If the measured strength ratio is less than the second reference value, the modulation scheme is determined to be BPSK.

At transmission, the radio unit 116 performs D-A conversion on a baseband signal processed by the modem unit 110 and frequency-converts it to a radiofrequency and then transmits an amplified radiofrequency signal by an antenna described later. At receiving, the signal inputted from the antenna is amplified by an LNA (Low Noise Amplifier) and is then frequency-converted to a baseband frequency, A-D converted and outputted as a baseband signal of the modem unit 110.

The terminal antenna 118 transmits and receives radiofrequency signals. The terminal antenna 118 may be either a nondirectional antenna or an antenna of a predetermined directivity.

The control unit 120 carries out a timing processing of the terminal apparatus 100, a control signal processing or the like.

The basestation antenna 202 transmits and receives radiofrequency signals. The basestation antenna 202 may be either a nondirectional antenna or an antenna of a predetermined directivity.

The radio unit 204 carries out frequency conversion between baseband signals and radiofrequency signals, which are processed by the modem unit 206 described later, amplification, A-D or D-A conversion and the like.

The modem unit 206 modulates information to be transmitted and demodulates information received. Any of BPSK, $\pi/4$ shift QPSK and 16QAM is adaptively selected as the modulation scheme. Although shown here is the connection with a single terminal apparatus, the modulation and demodulation are carried out for each of terminal apparatuses if a plurality of terminal apparatuses are connected.

The processing unit 208 carries out a connection processing of radio channel and also performs coding and decoding of transmitted/received data.

The quality deriving 210 unit measures, as appropriate, the quality of a received signal as the quality of a signal in the uplink. Similar to the quality measurement unit 112 in the terminal apparatus 100, the strength of a desired received signal, the strength of a received interference signal, the ratio in strength between desired signal and interference signal, or the like is measured, as the quality of a received signal, from a signal demodulated by the modem unit 206 or an RSSI.

On the other hand, as the quality of a signal in the downlink, information on a modulation scheme determined by the modulation scheme determining unit 114 in the terminal apparatus 100 is detected from a signal received from the terminal apparatus 100.

The modulation scheme control unit 212 determines the modulation schemes suitable for the quality of uplink signals measured by the quality deriving unit 210 and the quality of downlink signals detected by the quality deriving unit 210, for the uplink and the downlink, respectively. If the signal quality is the ratio in strength between desired signal and interference signal, the modulation scheme control unit 212 compares a reference value stored beforehand in the storage unit 216 with the ratio in strength between desired signal and interference signal and determines a modulation scheme.

FIG. 2 is a comparison table used in determining the switching of modulation scheme. Similar to the aforementioned modulation scheme determining unit 114, there are two reference values defined as "A" and "B", respectively.

If the ratio in strength between a measured desired signal and the interference signal is greater than or equal to "A", the modulation scheme will be determined to be 16QAM. If the ratio in strength between the measured desired signal and the interference signal is greater than or equal to "B" and less than "A", the modulation scheme will be determined to be $\pi/4$ shift QPSK. If the ratio in strength between the measured desired signal and the interference signal is less than "B", the modulation scheme will be determined to be BPSK. This comparison table may be stored in memory (not shown) provided in the modulation scheme control unit 212, or may be stored in the storage unit 216. That is, it suffices if it is accessible from the modulation scheme control unit 212.

Referring back to FIG. 1, when the function verification unit 214 receives from the processing unit 208 a function verification instruction on the connection of radio channel, it reads out information, on the function of the base station apparatus 200, stored in the storage unit 216 and then exchanges the function verification information with the terminal apparatus 100 via the processing unit 208.

When the data exchange at the function verification unit 214 has been completed, the priority information detector 215 detects a request signal of a line to be given the priority and then analyzes the content of the detected request signal so as to be stored in the storage unit 216.

The storage unit 216 stores the function verification information obtained by the function verification unit 214 and the information, on a line to be given the priority, obtained by the priority information detector 215.

The data amount monitoring unit 218 continuously monitors the amount of signals, namely, the amount of data, which the terminal apparatus 100 transmits and receives with the network 300 via the base station apparatus 200. More specifically, in the case of data communication using packets, for example, the amount of occurrence, per unit time, of packets which has allocated effective data is measured.

The interface unit 220 undertakes a role of connecting the base station apparatus with the network, and transmits to and receives from a control center apparatus (not shown) a call connection to a communications party via the network, management information such as charge information and position registration information, or the like. One example of the network is ISDN (Integrated Services Digital Network), and it is assumed herein that the interface unit 220 has a physical form or electric specifications compatible with ISDN.

The control unit 222 carries out processings such as various timing processings for the base station apparatus 200, wireless connection control with the terminal apparatus 100 and wired connection control with the network 300.

In terms of hardware, the above-described structure can be realized by a CPU, a memory and other LSIs of an arbitrary computer. In terms of software, it can be realized by programs, which are stored beforehand on memory, not shown and are read out during execution, or the like, but drawn and described herein are function blocks that are realized in cooperation with those. Thus, it is understood by those skilled in the art that these function blocks can be realized in a variety of forms such as by hardware only, software only or the combination thereof.

Figure 3:
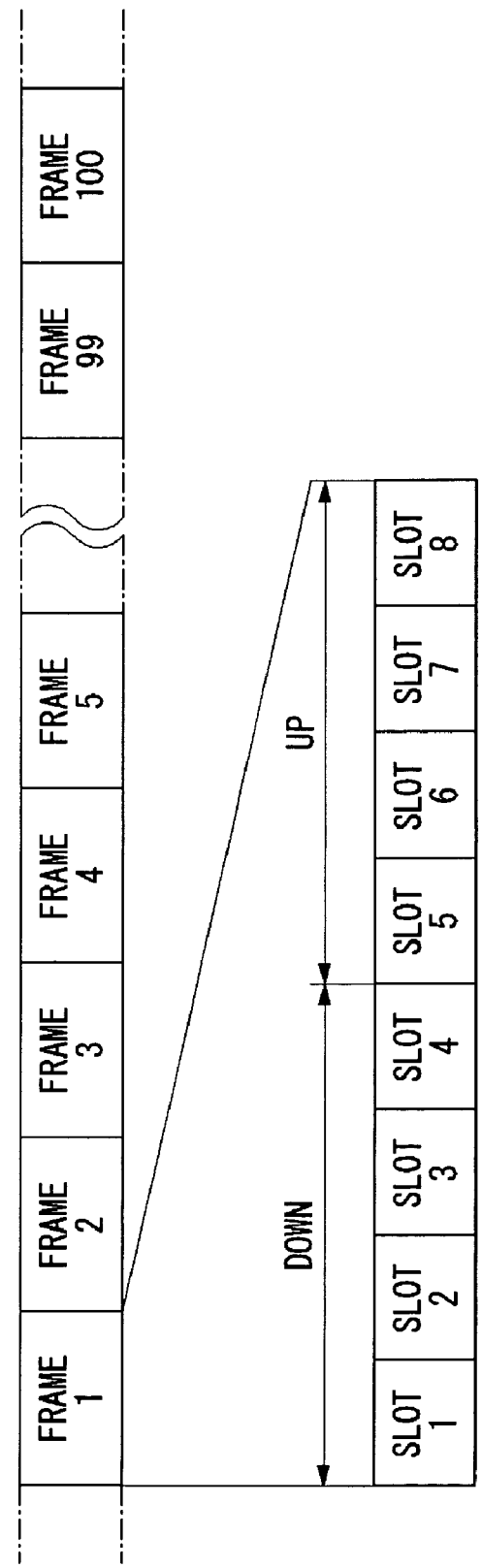
FIG. 3 illustrates a frame format of FIG. 1.

FIG. 3 shows a frame format in a radio area. This is the frame format for a personal handyphone system, and indicates 4-channel multiple multi-carrier TDMA/TDD (Time Division Multiple Access) scheme. One frame is decomposed to eight slots in a time division manner and then used.

More specifically, among the eight slots, four slots are used for a downward direction from the base station apparatus 200 to the terminal apparatus 100 and the remaining four slots are used for an upward direction from the terminal apparatus 100 to the base station apparatus 200.

FIG. 4 shows a structure of data, stored in the storage unit 216 in the base station apparatus 200, by which the connection with a terminal apparatus is managed.

"Terminal ID" is an ID to identify a terminal apparatus, and is allotted uniquely to each terminal apparatus. Although the terminal apparatus is identified by the numerical symbols like "11111" here, a combination of alphabets and numbers may be used. "Function verification information" is an item that indicates a function provided in a terminal apparatus. For example, "Type_A" denotes a terminal apparatus equipped with a plurality of modulation schemes (BPSK as a modulation scheme of high degree of reliability, 16QAM as a modulation scheme of a large amount of information, and π/4 shift QPSK as a modulation scheme of an intermediate level therebetween) and equipped with the so-called adaptive modulation capability that controls the modulation scheme in accordance with a channel circumstance. And "Type_B" denotes a conventional-type terminal apparatus equipped with a single modulation scheme (π/4 shift QPSK) only.

"Line priority information" is displayed when the line to be given priority between uplink and downlink is set by a terminal apparatus and the function is verified after a connection has been established. If a conventional-type terminal apparatus equipped with a single modulation scheme only is used or if an apparatus is equipped with an adaptive modulation capability but the line to be prioritized is not set, the description of "line priority information" will indicate that no setting has been done.

"Modulation scheme" displays the modulation schemes in a line, which is currently being connected, for uplink and downlink, separately.

Figure 5:
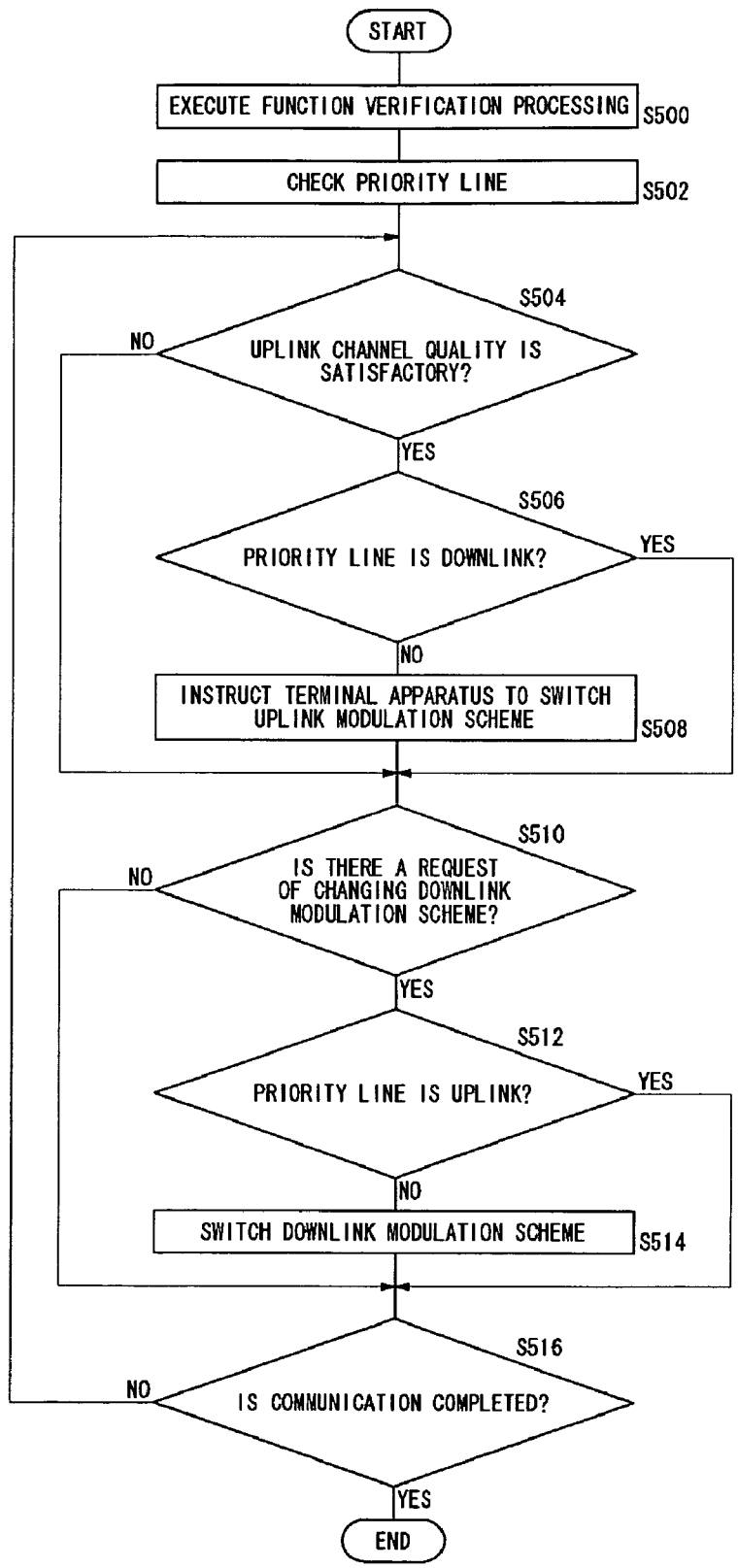
FIG. 5 is a flowchart showing a communication connecting operation in the base station apparatus of FIG. 1.

FIG. 5 is a flowchart showing a communication connecting operation in the base station apparatus 200.

In the operation described by this flowchart, explained is a case where the base station apparatus 200 detects a request, sent from the terminal apparatus 100, indicating that uplink or downlink is given the priority and then an adaptive modulation processing is carried out according to said request.

When a communication with the terminal apparatus 100 is started, the base station apparatus 200 exchanges with the terminal apparatus 100 the information on functions provided respectively, through the function verification unit 214 (S500), verified through the priority information detector 215 the presence or absence of a request signal, for a line to be prioritized, sent from the terminal apparatus 100 and stores the results in the storage unit 216.

Here, verifying the presence or absence of a request signal for a line to be prioritized indicates a processing of verifying the presence or absence of a request signal to the effect that either uplink or downlink be preferentially handled on a radio link between the base station apparatus 200 and the terminal apparatus 100, and the terminal apparatus 100 composes the request signal of as part of function verification information message or an independent message and conveys it to the base station apparatus 200.

When the line to be prioritized is verified, the modulation scheme control unit 212 inputs from the quality deriving unit 210 a measurement result of the channel quality of the uplink and determines the quality thereof in view of the criteria set for modulation scheme switching shown in FIG. 2 (S504). When the channel quality is determined satisfactory (the modulation of a large amount of information is utilizable in place of the current modulation scheme in use) (S504-Y), whether or not the downlink is set to a line to be prioritized is verified by referring to information, on setting the line to be prioritized, stored in the storage unit 216 (S506).

If the line to be prioritized is not set to the downlink (S506-N), the modulation scheme control unit 212 generates an instruction message indicating that the modulation scheme of uplink must be changed to the modulation scheme determined in S504 and transmits the instruction message to the terminal apparatus 100 via the modem unit 206.

If, on the other hand, the line to be prioritized is set to the downlink (S506-Y), the modulation scheme of the uplink will not be switched in order not to stop the data communication in the downlink.

When the processing for the uplink has been completed, the modulation scheme control unit 212 continuously verifies the downlink. More specifically, the modulation scheme control unit 212 detects the modulation scheme determined by the modulation determining unit 114 in the terminal apparatus 100 and verifies whether or not there is a request to change the modulation scheme (S510).

If a message requesting the change of modulation scheme is detected (S510-Y), whether the uplink is preferentially set or not is verified by referring to the storage unit 216 (S512). If, on the other hand, the uplink is not preferentially set in this verification (S512-N), the modulation scheme control unit 212 activates the switching of modulation scheme by controlling the modem unit 206. If, on the other hand, the uplink is preferentially set (S512-Y), the modulation scheme of the downlink will not be switched in order not to stop the data communication in the uplink.

When the processing for both the uplink and the downlink is completed, whether the communication has been completed or not is verified (S516). If it has not been completed, the aforementioned processing will be repeated (S516-N). If it has been completed, the communication is terminated (S516-Y).

Figure 6:
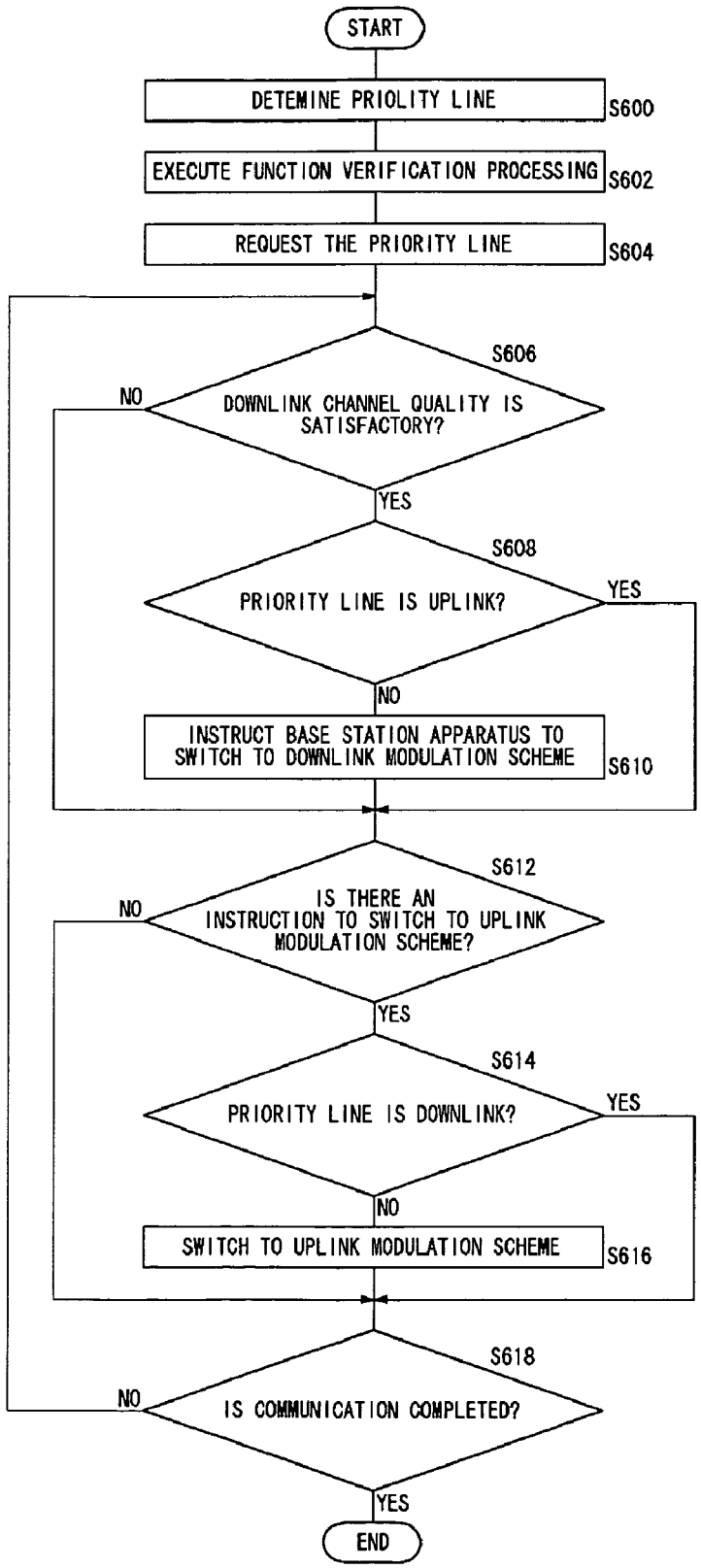
FIG. 6 is a flowchart showing a communication connecting operation in the terminal apparatus of FIG. 1.

FIG. 6 is a flowchart showing a communication connecting operation in the terminal apparatus 100.

In the operation described by this flowchart, explained is a case where the terminal apparatus 100 sends out to the base station apparatus a request indicating that uplink or downlink is to be given the priority and then an adaptive modulation processing is carried out.

When the processing unit 104 in the terminal apparatus 100 detects that a communication application has been activated from an operator or the like via the operation display unit 102, the processing unit 104 conveys the start of communication to the function verification unit 106 and has the priority information generator 105 decide the line to be prioritized according to the application (S600). This decision on the line to be given priority indicates which of either an uplink or a downlink is to be preferentially handled. For example, if the operator activates browser software with which to access a website or the like, via the network 300, then the priority information generator 107 determines that the amount of data transmitted through downlink will become overwhelmingly large compared with the amount of data transmitted through uplink and therefore it determines that the downlink be the line to be given the priority.

When the line to be prioritized is decided, the processing unit 104 sends out to the base station apparatus 200 a message requesting the assignment or the like of radio channel so as to start a connection processing of radio link.

In this connection processing, the channel assignment or synchronization establishment on a radio link between the terminal apparatus 100 and the base station apparatus 200 is carried out and subsequently the information on functions provided respectively is exchanged (S602), and a request to set a line to be prioritized is sent from the terminal apparatus 100 to the base station apparatus 200 (S604).

When the line to be prioritized is verified, the modulation scheme determining unit 114 first inputs from the quality deriving unit 112 a measurement result of the channel quality of the downlink and verifies the channel quality (S606).

Then, if it is determined that switching the modulation scheme to a compatible modulation scheme is possible (the channel quality is satisfactory) (S606-Y), whether or not the uplink is set to a line to be prioritized is verified by referring to information, on setting the line to be prioritized, determined in S600 (S608).

Here, if the line to be prioritized is not set to the uplink (S608-N), the modulation scheme determining unit 114 generates an instruction message indicating that the modulation scheme of downlink must be changed to a new modulation scheme and transmits the instruction message to the base station apparatus 200 via the modem unit 110 (S610).

If, on the other hand, the line to be prioritized is set to the uplink (S608-Y), the instruction message requesting the switching of downlink will not be generated or sent in order not to stop the data communication in uplink.

When the processing for downlink is completed, the modulation scheme determining unit 114 continuously verifies the uplink. More specifically, whether an instruction message of switching the modulation scheme is transmitted from the base station apparatus 200 or not is monitored (S612).

If a message ordering the change of modulation scheme is detected (S612-Y), the prior setting of the line to be prioritized is revalidated (S614). If the downlink is not preferentially set (S614-N), the modulation scheme determining unit 114 activates the switching of modulation scheme by controlling the modem unit 110. If, on the other hand, the downlink is preferentially set (S614-Y), the modulation scheme of downlink will not be switched in order not to stop the data communication in downlink.

When the processing for both uplink and downlink is completed, whether the communication has been completed or not is verified (S618). If it has not been completed, the aforementioned processing will be repeated (S618-N). If it has been completed, the communication is terminated (S618-Y).

Figure 7:
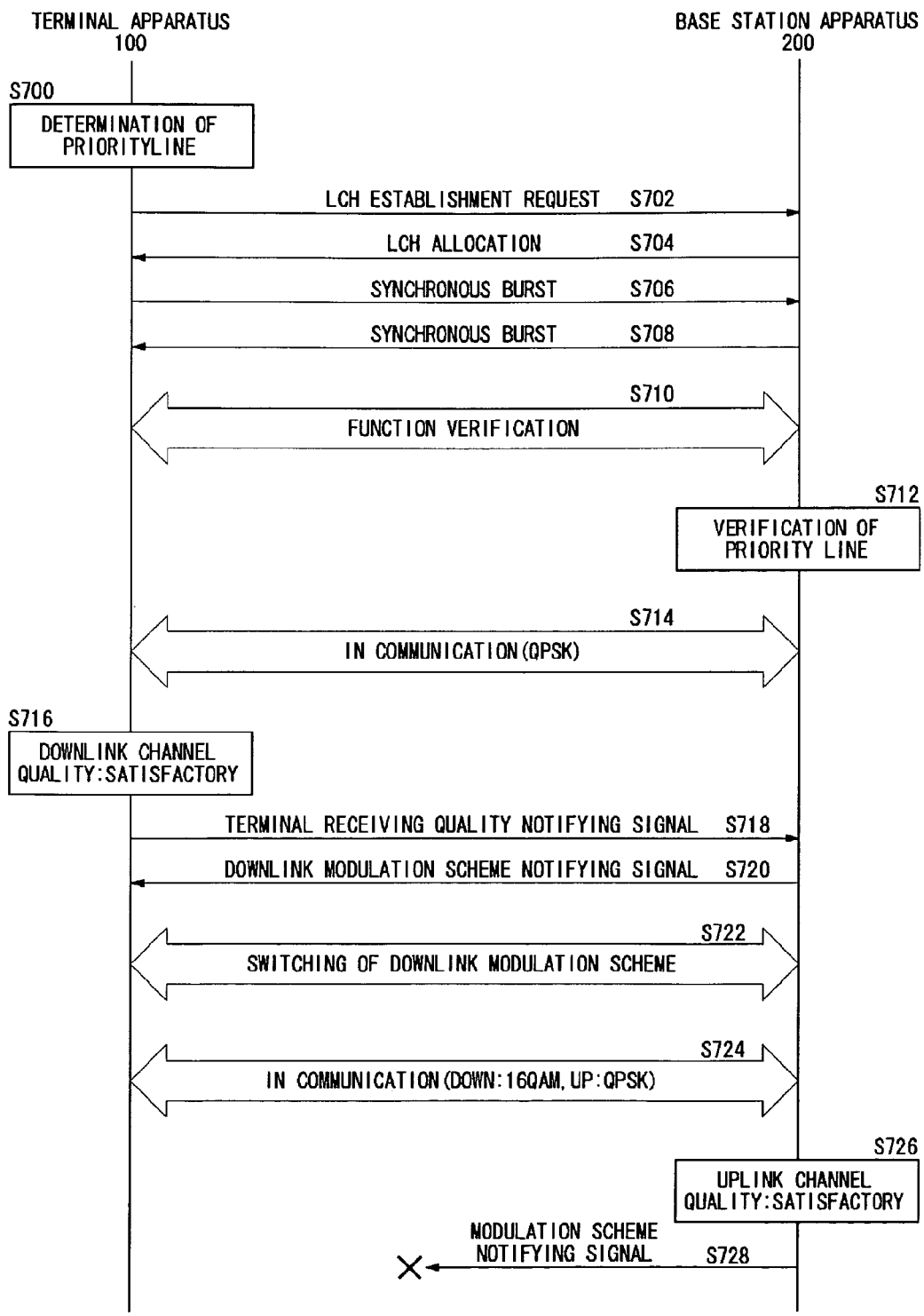
FIG. 7 is a sequence diagram for connection between the terminal apparatus and the base station apparatus of FIG. 1.

FIG. 7 is a sequence diagram for connection between a terminal apparatus and a base station apparatus when the modulation scheme is changed by setting the line to be prioritized.

In an operation described below, the description will be given, for example, assuming a case where an operator activates application with which to browse a website and the priority information generator 105 performs a setting such that the downlink is to be given the priority.

When the start of communication by a predetermined application is instructed by an operator of a terminal apparatus 100, the terminal apparatus 100 determines by a priority information generator 105 a line to be given the priority according to the application (S700), generates an "LCH (Link Channel) establishment request" message that requests the assignment of radio channel to the base station apparatus 200 and transmits the message via the radio unit 116 (S702).

In the base station apparatus 200, the processing unit 208 analyzes the "LCH establishment request" message and checks on the availability of radio channel. If there is vacancy, an "LCH assignment" message is generated and sent back (S704). If there is no vacancy, an "LCH assignment rejection" message is generated and sent back.

In the terminal apparatus 100, on the other hand, the processing unit 104 analyzes a message sent back from the base station apparatus 200. If the message is the "LCH assignment" message, the radio channel assigned is set in the radio unit 116. If it is the "LCH assignment rejection" message, the "LCH establishment request" message is sent again to other base station apparatus and an assignment of radio channel is received.

Now, in the base station apparatus 200 which has assigned the radio channel and in the terminal apparatus 100 that has received the assignment, a synchronous burst is transmitted and received in the channel assigned (S706, S708) so as to attempt to establish synchronization. After having established synchronization, the respective functions provided are checked by the function verification units (106, 214), respectively (S710) and, in addition, the setting of a line to be prioritized is communicated from the terminal apparatus 100 to the base station apparatus 200 (S712).

It is to be noted that the modulation scheme used at an initial communication state, after the verification of functions, is the $\pi/4$ shift QPSK provided commonly among all the apparatuses irrespective of compatibility with adaptive modulation of the terminal apparatus and base station apparatus due to the fact that the channel circumstance is unknown.

In the terminal apparatus 100 and base station apparatus 200 reaching a communication status, a data communication is started (S714) and at the same time the quality of each received signal is continuously monitored by the quality measurement unit 112 in the terminal apparatus 100 and the quality deriving unit 210 in the base station apparatus 200. Then in the uplink or downlink, whether the quality has a level greater than or equal to a predetermined value or not is checked. If the quality is verified as being greater than or equal to the predetermined value, a switching procedure of modulation scheme is started in light of information on the line to be prioritized set in S700.

More specifically, for example, if the uplink is set as one to be given the priority and it is judged by the quality measurement unit 112 in the terminal apparatus 100 that the channel quality of the downlink is satisfactory (S716), the terminal apparatus 100 transmits to the base station apparatus 200 a "terminal receiving quality notification signal" message that requests the switching of the downlink (S718).

In the base station apparatus 200, whether the content of the message can be handled or not is checked by the modulation scheme control unit 212, and if it can, a "modulation scheme notification signal" message is sent back (S720).

When this "modulation scheme notification signal" message is transmitted and received between the terminal apparatus 100 and the base station apparatus 200, then the terminal apparatus 100 and the base station apparatus 200 will each stop temporarily the data communication mutually via the uplink and the downlink, carry out a switching processing of modulation for a downlink (S722) and start the communication by a new modulation scheme (S724).

When a communication by the new modulation scheme is started, monitoring the quality of each received signal is started again, in a continuous manner, by the quality deriving unit 200 in the base station apparatus 200. For example, if the channel quality of the uplink is judged to be satisfactory (S726), the modulation scheme control unit 212 does not switch the modulation scheme of the uplink (S728) and continues the communication under the presently used modulation scheme because the setting was made indicating that the downlink is the line to be given the priority.

An operation of a communication system 10 having the aforementioned structure will be described hereinbelow.

When the start of a predetermined application is instructed by an operator via the operation display unit 102, the terminal apparatus 100 causes the priority information generator 105 to decide a line to be prioritized according to an application, and requests a connection to the base station apparatus 200 through the processing unit 104.

The vacancy status of a radio channel is checked by the processing unit 208 in the base station apparatus 200. If there is vacancy, the assignment of a radio channel will be made and the establishment of a radio synchronization with the terminal apparatus will be attempted through said radio channel.

When the radio synchronization is established and the transmission/receiving of data becomes possible, the terminal apparatus 100 and the base station apparatus 200 exchange information on functions to verify the functions provided respectively and the terminal apparatus 100 conveys to the base station apparatus 200 the information on the previously determined line to be prioritized.

In the terminal apparatus 100 and the base station apparatus 200, the information, on functions of the terminal apparatus and base station apparatus, obtained by the exchange of information on functions and the information on a line to be prioritized are stored in the storage units (108, 216), respectively.

Now, when the radio synchronization has been established and the exchange of information on functions or the like has been completed, the terminal apparatus 100 and the base station apparatus 200 each starts the data communication in π/4 shift QPSK. In addition, the quality of a channel is verified by the quality measurement unit 112 of the terminal apparatus 100 for the downlink and it is verified by the quality deriving unit 210 of the base station apparatus 200 for the uplink in a continuous manner.

In a case where the setting is such that the downlink is to be prioritized, for example, if the quality of a channel in the downlink is determined to be satisfactory by the quality measurement unit 112 in the terminal apparatus 100, the terminal apparatus 100 transmits to the base station apparatus 200 a "terminal receiving quality notification signal" message that requests the change of modulation scheme in the downlink. In response to this, whether or not it can be handled in the modulation scheme control unit 212 of the base station apparatus 200 is checked. If it can, a "modulation scheme notification signal" message is sent back. When the message is transmitted and received, the data communication at both the uplink and downlink sides is temporarily stopped and a switching processing of modulation scheme for the downlink is carried out so as to start the communication by a new modulation scheme.

On the other hand, in a case where the setting is such that the downlink is to be prioritized, if the quality of a channel in the uplink is determined to be satisfactory by the quality deriving unit 210 in the base station apparatus 200, the modulation scheme control unit 212 does not switch the modulation scheme of the uplink and continues the communication under the presently used modulation scheme because it was verified from the storage unit 216 that the setting was made indicating that the downlink is to be given the priority.

Next, in a case where the setting is such that the uplink is to be prioritized, if the quality of a channel in the downlink is determined to be satisfactory by the quality measurement unit 112 in the terminal apparatus 100, the terminal apparatus 100 does not generate a "terminal receiving quality notification signal" message requesting the change of the modulation scheme in the downlink, and continues the communication under the presently used modulation scheme because the setting was indicating that the uplink is to be prioritized.

On the other hand, in a case where the setting is such that the uplink is to be prioritized, if the quality of a channel in the uplink is determined to be satisfactory by the quality deriving unit 210 in the base station apparatus 200, the base station apparatus 200 generates an "uplink modulation scheme switching instruction" message, and sends it out to the terminal apparatus 100. When the message is received, the data communication at both the uplink and downlink sides are temporary stopped and a switching processing of modulation scheme for the uplink is carried out so as to start the communication by a new modulation scheme.

According to the present embodiment, when a processing adaptive modulation is carried out, the base station apparatus 200 controls the activation of a modulation scheme switching processing so that the data communication in a line so set as to be given the priority between the uplink or downlink is given the priority. Thus, for example, when a large amount of data is transmitted and received in the downlink, a temporary interruption of the downlink to switch the uplink modulation scheme is not caused, so that the deterioration of transmission efficiency can be prevented.

The terminal apparatus 100 determines a line which is to be given the priority between the uplink or downlink, according to an application activating operation from an operator so as to be conveyed to the base station apparatus 200. The terminal apparatus 100 disregards a request signal, instructed from the base station apparatus, indicating that a line to be prioritized shall be interrupted. Thus, the efficient communication which corresponds to a data-generation situation for each application can be carried out.

The present invention has been described based on the embodiments which are only exemplary. It is therefore understood by those skilled in the art that other various modifications to the combination of each component and process described above are possible and that such modifications are also within the scope of the present invention.

In the present embodiment, a structure is such that a line to be prioritized is set from the terminal apparatus 100, but the structure is not limited thereto and the line may be set independently by the base station apparatus 200. For instance, at the start of a communication, the information on the telephone numbers that the terminal apparatus 100 intends to connect to may be extracted and the degrees of priority for the uplink and the downlink may be set for each telephone number. Or the type of an application activated in the terminal apparatus may be determined from information transmitted/received at the time of the start of a communication and the degrees of priority for the uplink and the downlink may be set based on the information.

In the base station apparatus 200, whether the modulation scheme is to be switched or not was decided based on the setting of a line to be prioritized and the quality of a channel, but is not limited thereto. For instance, in the base station apparatus 200, a structure may be such that the actual amount of data for a line set as the line to be prioritized is monitored so that the switching of modulation scheme is activated if the amount is small.

Hereinbelow, the detailed description will be given.

Figure 8:
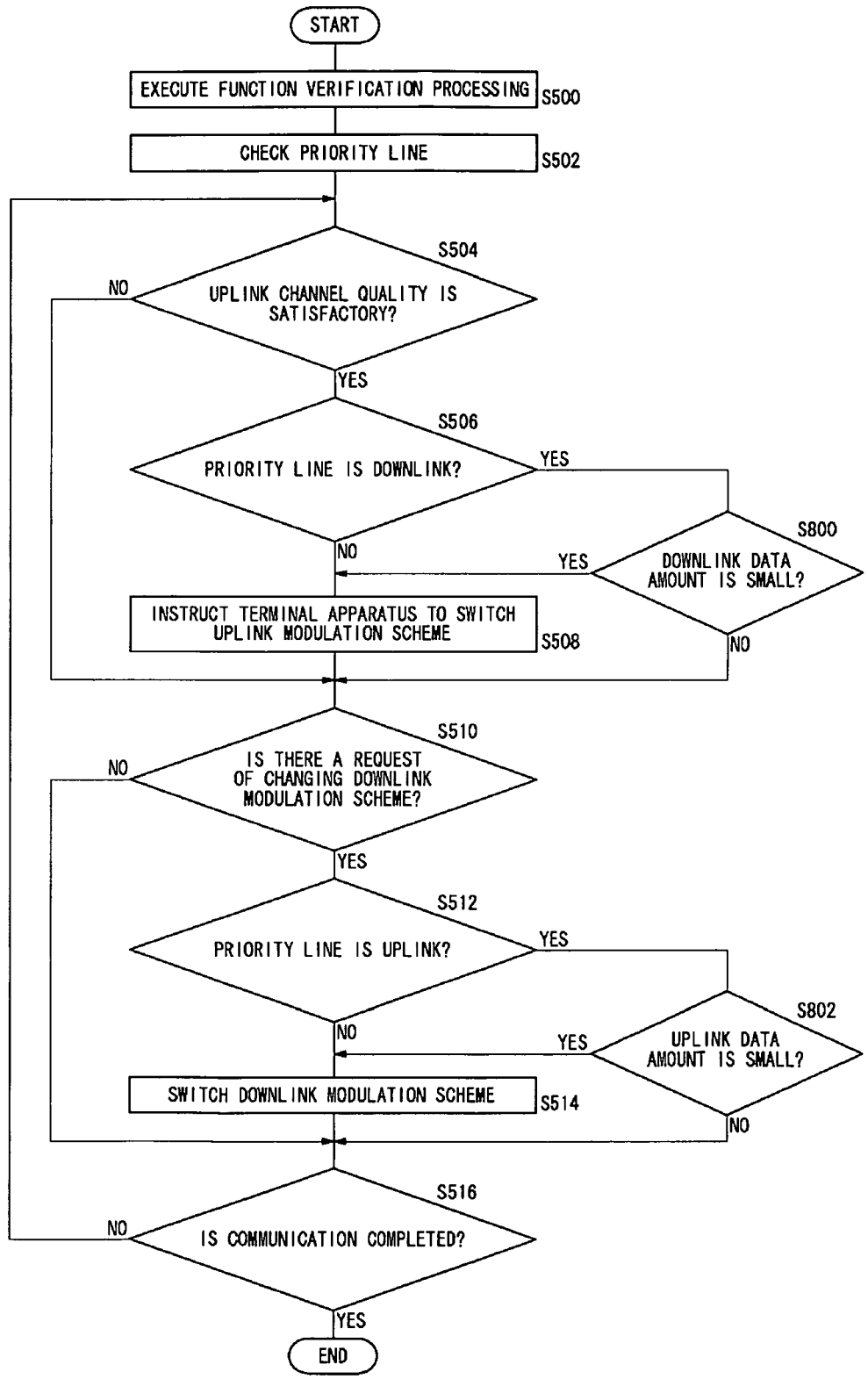
FIG. 8 is a flowchart showing a communication connecting operation for the terminal apparatus of FIG. 1.

FIG. 8 is a flowchart showing a communication connecting operation in a base station apparatus 200.

In this flowchart, similar to the operation explained with reference to FIG. 5, the basic structure is such that the base station apparatus 200 detects a request, sent from the terminal apparatus 100, indicating that an uplink or downlink is to be prioritized and then carries out a processing of adaptive modulation according to the request. The operation of FIG. 8 differs from that of FIG. 5 in that whether the processing of adaptive modulation is finally activated or not is decided by referring to the data amount in the data monitoring unit 218.

The details will be described hereinbelow centering around points that differ. The same operations as those explained in FIG. 5 are given the same numerals (S500 to S516) as those of FIG. 5, and the description therefor will be simplified or omitted.

When the line to be prioritized is verified and reaches the state of a communication, the base station apparatus 200 checks the channel quality of an uplink (S504) and detects a downlink modulation scheme change request signal (S510).

If it is judged that the quality of a channel in the uplink is satisfactory in light of the criteria shown in FIG. 2, the setting of a line to be prioritized is verified (S506).

Here, if the line to be prioritized is not set to the downlink (S506-N), the modulation scheme control unit 212 generates, similarly to FIG. 5, an instruction message indicating that the modulation scheme of the uplink must be changed to that determined in S504, and transmits the thus generated message to the terminal apparatus 100 via the modem unit 206.

If, on the other hand, the line to be prioritized is set to the downlink (S506-Y), in FIG. 5 a structure was such that the modulation scheme of the uplink is not switched in order not to interrupt the data communication in the downlink. In this operation, however, the amount of signals in the downlink is referred to by the data amount monitoring unit 218 (S800). More specifically, if it is judged by the monitoring by the data amount monitoring unit 218 that data being transmitted and received is large (S800-N), the modulation scheme of the uplink, in the same way as in FIG. 5, will not be switched. If, however, judged small (S800-Y), an instruction indicating that the modulation scheme of the uplink must be switched is issued to the terminal apparatus 100 (S508) even if the setting to the effect that the downlink be prioritized was made.

In a similar case where there is a request from the terminal apparatus 100, indicating that the modulation scheme of the downlink must be changed (S510), even if, for example, the setting is made to the effect that the uplink is given the priority (S512-Y), when the data amount for the uplink is judged to be small as a result of measurement by the data amount monitoring unit 218 (S802-Y), the processing which switches the downlink modulation scheme is started (S514).

FIG. 9 is a sequence diagram for connection between a terminal apparatus and a base station apparatus.

The sequence diagram shows the operation shown in FIG. 8 as a connection sequence between the terminal apparatus 100 and the base station 200.

Thus, the connection sequence shown in FIG. 7 forms the basis of this sequence diagram, and this sequence diagram differs from that shown in FIG. 7 in points where whether a processing of modulation scheme is finally activated or not is determined by referring to the information on the data amount measured by the data amount monitoring unit 218.

In the following description, a case is assumed, for example, similarly to FIG. 7, where an operator activates application with which to browse a website and the priority information generator 105 performs such setting that the downlink is to be given the priority. The components that overlap with that of FIG. 7 are given the same reference numerals (S700 top S726) and the description therefor will be simplified or omitted.

Now, the exchange of information on functions or a request to set a line to be prioritized is made between the terminal apparatus 100 and the base station apparatus 200 (S710, S712). When the modulation scheme of the downlink is switched (S716) (S718 to S722) as a result of having verified the quality of a channel during communication, a communication using a new modulation scheme is started (S724).

Here, for example, if the quality of a channel in the uplink is judged to be satisfactory in the quality deriving unit 210 of the base station apparatus 200 (S726), the modulation scheme control unit 212 does not switch the modulation scheme of the uplink (S728) and continues the communication under the presently used modulation scheme because in FIG. 7 the setting indicating that the downlink is the line to be given the priority was made. In contrast thereto, if the data amount of the downlink is judged to be small in FIG. 9 by the data amount monitoring unit 218 (S726), the modulation scheme control unit 212 transmits to the terminal apparatus 100 an "uplink modulation scheme switching instruction" message even in the event that the setting indicating that the downlink is the line to be prioritized, and switches the uplink modulation scheme (S902). Then the communication under a new modulation scheme is started (S904).

According to the present embodiment, when a processing of adaptive modulation is carried out, the base station apparatus 200 controls the activation of a modulation scheme switching processing so that the data communication in a line so set as to be given the priority between the uplink or downlink is given the priority, and controls the activation of a modulation scheme varying processing while the actual data amount of a line to be given the priority is being monitored. Thus, the deterioration of transmission efficiency for not only the line to be prioritized but also the line not to be prioritized can be even more prevented.

Furthermore, in the above embodiments a structure is such that a line to be prioritized is set and functions are provided based on said setting, but is not limited thereto. For example, if the terminal apparatus or base station apparatus is not provided with a function with which to set a priority line, it is also possible to set the modulation scheme of the uplink or downlink according to the data amount of the uplink or downlink, respectively.

INDUSTRIAL APPLICABILITY

Setting priority to either the uplink or the downlink is made in a radio link set between a terminal apparatus and a base station apparatus, and the best suited transmission rate is determined by referring to the information on the setting thereof, the quality of a channel or the data-generation amount of signals transmitted and received. As a result, the deterioration of transmission efficiency can be prevented.

What is claimed is:

1. A base station apparatus, comprising:
a communication unit which communicates with a predetermined terminal apparatus at a variable transmission rate;
a transmission rate varying unit which measures a quality of a channel for the predetermined terminal apparatus and performs a processing of varying a transmission rate of an uplink according to the quality, the processing involving a temporary stoppage of data communication in an uplink and downlink;
a receiving unit which receives request signals from the predetermined terminal apparatus via the communication unit;
a detector which detects information on whether the downlink is set to be prioritized, from signals received by the receiving unit; and
a communication control unit which causes the transmission rate varying unit to perform the processing of varying the transmission rate of the uplink if the downlink is not set to be prioritized and causes the transmission rate varying unit to stop the processing of varying the transmission rate in the uplink and maintains the transmission rate of the uplink if the downlink is set to be prioritized, wherein
prioritization of the downlink as set in the information detected by the detector is determined by the predetermined terminal apparatus.

2. A base station apparatus according to claim 1, further comprising a signal monitoring unit which monitors a type or amount of signals transmitted from and received by said communication unit,
wherein said communication control unit does not stop the varying processing in said transmission rate varying unit, according to the type or amount of signals of a line which is required to be prioritized by the information detected by the detector.

3. A base station apparatus, comprising:
a communication unit which communicates with a predetermined terminal apparatus at a variable transmission rate;
a transmission rate varying unit which acquires information on a channel quality from the predetermined terminal apparatus and performs, based on the information, a processing of varying a transmission rate of a downlink, the processing involving a temporary stoppage of data communication in an uplink and downlink;
a receiving unit which receives request signals from the predetermined terminal apparatus via the communication unit;
a detector which detects information on whether the uplink is set to be prioritized, from signals received by the receiving unit; and
a communication control unit which causes the transmission rate varying unit to perform the processing of varying the transmission rate of the downlink if the uplink is not set to be prioritized and causes the transmission rate varying unit to stop the processing of varying the transmission rate in the downlink and maintains the transmission rate of the downlink if the uplink is set to be prioritized, wherein
prioritization of the uplink as set in the information detected by the detector is determined by the predetermined terminal apparatus.

4. A base station apparatus according to claim 3, further comprising a signal monitoring unit which monitors a type or amount of signals transmitted from and received by said communication unit,
wherein said communication control unit does not stop the varying processing in said transmission rate varying unit, according to the type or amount of signals of a line which is required to be prioritized by the information detected by the detector.

5. A terminal apparatus, comprising:
a communication unit which communicates with a predetermined base station apparatus at a variable transmission rate;
a decision unit which determines either an uplink or a downlink, to which priority is to be given, with the predetermined base station apparatus;
a signal generator which generates a request signal, as information on the degree of priority of a line, for a line to which priority is to be given, and which sends the generated request signal to the predetermined base station apparatus;
a transmission rate varying unit which performs a processing of varying a transmission rate of an uplink or downlink by temporarily stopping data communication; and
a communication control unit which performs the processing of varying the transmission rate thereby varying the transmission rate if the link determined by the decision unit to be prioritized is identical to the link subject to variation of the transmission rate by the transmission rate varying unit, and does not perform the processing of varying the transmission rate and maintains the transmission rate if the uplink or downlink determined by the decision unit to be prioritized is different from the uplink or downlink subject to variation of the transmission rate by the transmission rate varying unit.

6. A terminal apparatus according to claim 5, wherein if the downlink is determined to be prioritized, said communication control unit disregards an instruction, issued from the base station apparatus, about a change in an uplink transmission rate and if the uplink is determined to be prioritized, it does not request the base station apparatus to vary the transmission rate, regardless of a channel quality of the downlink.

7. A method for determining a transmission rate, comprising:
communicating with a predetermined terminal apparatus at a variable transmission rate;
measuring a quality of a channel for a predetermined terminal apparatus and varying a transmission rate of an uplink according to the quality, the varying involving a temporary stoppage of data communication in an uplink and downlink;
receiving request signals from the predetermined terminal apparatus;
detecting information on whether the downlink is set to be prioritized, from the received request signals; and
causing by a control unit the varying the transmission rate of the uplink if the downlink is not set to be prioritized, and stopping the varying the transmission rate in the uplink and maintaining the transmission rate of the uplink if the downlink is set to be prioritized, wherein
prioritization of the downlink as set in the detected information is determined by the predetermined terminal apparatus.

8. A method for determining a transmission rate, comprising:
communicating with a predetermined terminal apparatus at a variable transmission rate;
acquiring information on a channel quality from the predetermined terminal apparatus and performing, based on the information, varying a transmission rate of a downlink, the varying involving a temporary stoppage of data communication in an uplink and downlink;
receiving request signals from the predetermined terminal apparatus;

detecting information on whether the uplink is set to be prioritized, from the received request signals received; and causing by a control unit the varying the transmission rate of the downlink if the uplink is not set to be prioritized, and stopping the varying the transmission rate in the downlink and maintaining the transmission rate of the downlink if the uplink is set to be prioritized, wherein prioritization of the uplink as set in the detected information is determined by the predetermined terminal apparatus.

9. A computer-readable recording medium storing program instructions thereon that, when executed by a processor, perform a method for determining a transmission rate, comprising:

communicating with a predetermined terminal apparatus at a variable transmission rate;

measuring a quality of a channel for a terminal apparatus and varying a transmission rate of an uplink according to the quality, the varying involving a temporary stoppage of data communication in an uplink and downlink;

receiving request signals from the predetermined terminal apparatus;

detecting information on whether the downlink is set to be prioritized, from the received request signals; and causing the varying the transmission rate of the uplink if the downlink is not set to be prioritized, and stopping the varying the transmission rate in the uplink and maintaining the transmission rate of the uplink if the downlink is set to be prioritized, wherein prioritization of the downlink as set in the detected information is determined by the predetermined terminal apparatus.

10. A computer-readable recording medium storing program instructions thereon that, when executed by a processor, perform a method for determining a transmission rate, comprising:

communicating with a predetermined terminal apparatus at a variable transmission rate;

acquiring information on a channel quality from the predetermined terminal apparatus and performing, based on the information, varying a transmission rate of a downlink, the varying involving a temporary stoppage of data communication in an uplink and downlink;

receiving request signals from the predetermined terminal apparatus;

detecting information on whether the uplink is set to be prioritized, from the received request signals received; and causing the varying the transmission rate of the downlink if the uplink is not set to be prioritized, and stopping the varying the transmission rate in the downlink and maintaining the transmission rate of the downlink if the uplink is set to be prioritized, wherein prioritization of the uplink as set in the detected information is determined by the predetermined terminal apparatus.

\* \* \* \* \*